(12) United States Patent
Iwatsu et al.

(10) Patent No.: US 7,639,794 B2
(45) Date of Patent: Dec. 29, 2009

(54) SERVICE USE DEVICE

(75) Inventors: Takeshi Iwatsu, Kanagawa (JP); Junichi Nakamura, Chiba (JP)

(73) Assignee: Sony Corporation, Tokyo (JP)

( * ) Notice: Subject to any disclaimer, the term of this patent is extended or adjusted under 35 U.S.C. 154(b) by 572 days.

(21) Appl. No.: 10/571,458

(22) PCT Filed: Aug. 6, 2004

(86) PCT No.: PCT/JP2004/011645

§ 371 (c)(1),
(2), (4) Date: Mar. 13, 2006

(87) PCT Pub. No.: WO2005/031585

PCT Pub. Date: Apr. 7, 2005

(65) Prior Publication Data

US 2007/0044020 A1    Feb. 22, 2007

(30) Foreign Application Priority Data

Sep. 29, 2003    (JP) .............................. 2003-338916

(51) Int. Cl.
*H04M 1/00* (2006.01)
*H04M 3/00* (2006.01)

(52) U.S. Cl. .............................. 379/355.07; 379/207.13

(58) Field of Classification Search .............. 379/201.1, 379/207.13, 355.07
See application file for complete search history.

(56) References Cited

U.S. PATENT DOCUMENTS 5,535,409 A * 7/1996 Larvoire et al. ................ 726/28

6,480,096 B1 * 11/2002 Gutman et al. ............. 340/5.31
2005/0060701 A1   3/2005 Murase
2005/0091679 A1   4/2005 Tanaka et al.

FOREIGN PATENT DOCUMENTS

| JP | 10-269182 | 10/1998 |
| JP | 11-184756 | 7/1999 |
| JP | 2001-092783 | 4/2001 |

(Continued)

OTHER PUBLICATIONS

U.S. Appl. No. 10/526,902, filed Aug. 16, 2005, Yamashita et al.

(Continued)

*Primary Examiner*—Alexander Jamal
(74) *Attorney, Agent, or Firm*—Oblon, Spivak, McClelland, Maier & Neustadt, L.L.P.

(57) ABSTRACT

A service utilizing apparatus includes an interface that transmits, to a service providing apparatus, user information together with request information that requests a user registration, and receives registration completion information indicating a completion of the user registration from the service providing apparatus. The service utilizing apparatus also includes a memory that stores the user information according to the received registration completion information. The service utilizing apparatus further includes a processor that detects a change in the service utilizing apparatus and deletes the user information stored in the memory when the processor detects the change in the service utilizing apparatus. Additionally, the interface transmits to the service providing apparatus delete request information that requests a deletion of the user information when the processor detects the change in the service utilizing apparatus.

18 Claims, 15 Drawing Sheets

FOREIGN PATENT DOCUMENTS

| JP | 2002-007937 | 1/2002 |
|----|-------------|--------|
| JP | 2002-014930 | 1/2002 |
| JP | 2002-24105  | 1/2002 |

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kieckoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 1, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,774, filed Mar. 15, 2006, Sakoh et al.
U.S. Appl. No. 10/573,647, filed Mar. 28 2006, Kikkoji et al.

\* cited by examiner

| | |
|---|---|
| HDD | - APPARATUS NAME<br>- NETWORK INFORMATION<br>- KEY INPUT PATTERN<br>- BOOKMARK<br>- WORD REGISTRATION INFORMATION<br>- SERVICE PROVIDING INFORMATION<br>- FEP LEARNING INFORMATION |
| RAM | - USER ID<br>- PASSWORD |
| FLASH MEMORY | ( - USER ID<br>- PASSWORD ) |

FIG. 6

SERVICE USE DEVICE

TECHNICAL FIELD

The present invention relates to a service utilizing apparatus suitably applied to a service providing system which provides a service of downloading content data such as music to a user's terminal.

BACKGROUND ART

Conventionally, in a service providing system, there is available a service in which a terminal, which serves as a service utilizing apparatus, can acquire content such as music from a management server for managing the system in response to a user's operation instruction.

In receiving such a service in this service providing system, settlement processing or the like is required for content acquisition and, therefore, user ID for identification and password corresponding to the user ID (hereinafter, which are collectively referred to as user authentication information) is transmitted from the terminal to the management server.

The terminal needs to transmit the user authentication information every time the user utilizes a service. This is troublesome for the user. In order to cut out the need of inputting the user authentication information each time, the user authentication information is previously stored in the terminal and is read out according to the need.

Further, there is available a terminal that stores, as bookmarks, web pages that the user frequently visits. Thus, the terminal stores user utilization information such as the bookmarks that differ from user to user and thereby increases usability (refer to, for example, Patent Document 1).

Patent Document 1 Jpn. Pat. Appln. Laid-Open Publication No. 2002-216099 (Page 14, FIG. 1).

However, such a terminal may be used by another user different from the original user in some cases due to handover.

In such a case, deletion of the user authentication information or user utilization information (which are collectively referred to as individual information) stored in the terminal through a user's operation prevents the individual information from being disclosed to another user.

However, in the case where the user fails to delete the individual information, the case where the terminal is stolen, or the case where the terminal is used by another user without permission, there is a possibility that the individual information is disclosed to and misused by another user.

DISCLOSURE OF INVENTION

The present invention has been made in view of the above points, and an object thereof is to propose a service utilizing apparatus, a service utilizing method, and a service utilizing program that can prevent information leakage by detecting a change of a user of the apparatus and deleting user information.

To solve the above problem, a service utilizing apparatus according to the present invention comprises: a transmission means for transmitting, to a service providing apparatus, user information together with request information that requests user registration; a reception means for receiving registration completion information indicating completion of the user registration, the registration completion information being transmitted from the service providing apparatus after the user registration using the user information has been completed; a storage means for storing the user information according to the received registration completion information in a storage medium; a user change detection means for detecting a change of a user who receives a service; and a delete means for deleting the user information stored in the storage medium when the user change detection means detects the change of a user.

With the service utilizing apparatus, it is possible to detect a change of a user who receives a service as well as to automatically delete the user information from the storage medium and service providing apparatus when the change of a user is detected.

A service utilizing method according to the present invention includes: transmitting, to a service providing apparatus, user information together with request information that requests user registration; receiving registration completion information indicating completion of the user registration, the registration completion information being transmitted from the service providing apparatus after the user registration using the user information has been completed; storing the user information according to the received registration completion information in a storage medium; and deleting the user information stored in the storage medium when a change of a user that receives the service is detected.

With the service utilizing method, it is possible to detect a change of a user who receives a service as well as to automatically delete the user information from the storage medium and service providing apparatus when the change of a user is detected.

A service utilizing program according to the present invention allows an information processor to execute to transmit, to a service providing apparatus, user information together with request information that requests user registration; to receive registration completion information indicating completion of the user registration, the registration completion information being transmitted from the service providing apparatus after the user registration using the user information has been completed; to store the user information according to the received registration completion information in a storage medium; and to delete the user information stored in the storage medium when a change of a user that receives the service is detected.

With the service utilizing program, it is possible to detect a change of a user who receives a service as well as to automatically delete the user information from the storage medium and service providing apparatus when the change of a user is detected.

According to the present invention, it is possible to detect a change of a user who receives a service as well as to automatically delete the user information from the storage medium and service providing apparatus when the change of a user is detected. Thus, it is possible to realize a service utilizing apparatus, a service utilizing method, and a service utilizing program capable of preventing leakage of user information even when the service utilizing apparatus is used by another user.

BRIEF DESCRIPTION OF DRAWINGS

FIG. 6 is a schematic diagram explaining storage of user information;

BEST MODE FOR CARRYING OUT THE INVENTION

An embodiment of the present invention will be described in detail with reference to the accompanying drawings.

(1) Entire Configuration of Service Utilizing System

Figure 1:
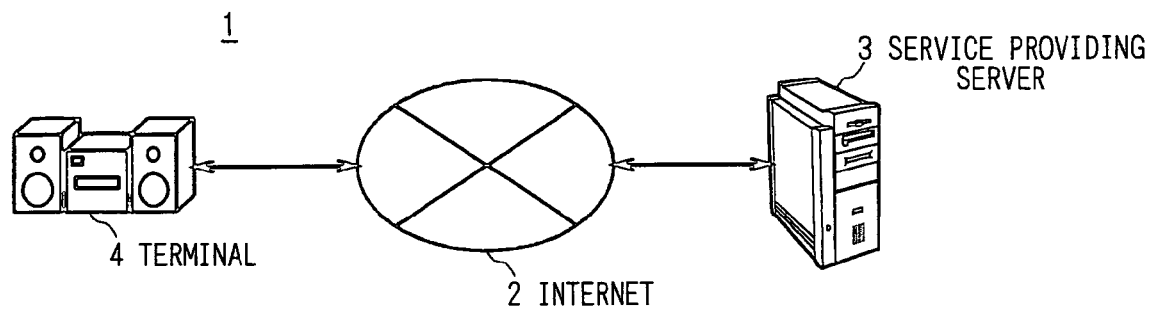
FIG. 1 is a schematic diagram showing the entire configuration of a service providing system according to an embodiment of the present invention.

As shown in FIG. 1, reference numeral 1 denotes a service utilizing system constituting the present invention, in which a service providing server 3 and a terminal 4 are connected to the Internet 2.

The service providing server 3 provides content data such as music in response to a request from the terminal 4 and the like, as well as manages information related to the terminal 4 and information related to a user who owns the terminal 4.

The terminal 4 performs reception of radio broadcasts and reproduction of a CD (Compact Disk) and the like, as well as acquires content data from the service providing server 3 so as to reproduce the data.

(1-1) Configuration of Service Providing Server

Figure 2:
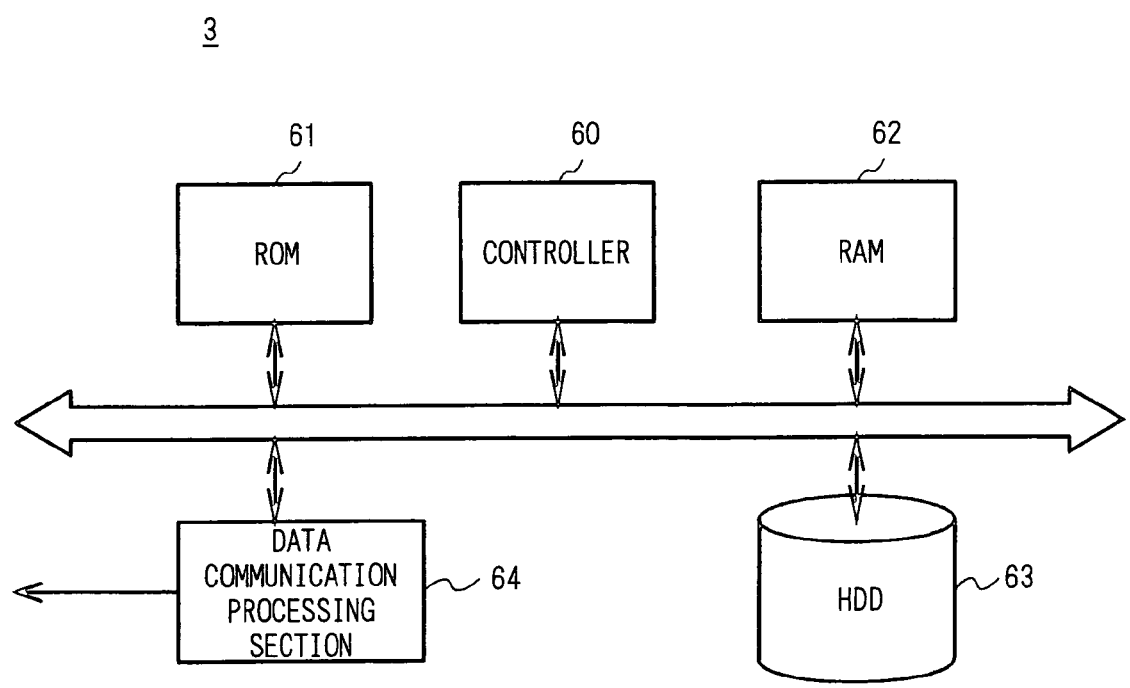
FIG. 2 is a schematic block diagram showing a configuration of a service providing server.

As shown in FIG. 2, in the service providing server 3, a controller 60 constituted by a CPU (Central Processing Unit) performs the entire control of the apparatus, computation processing, or the like based on a basic program such as an OS (Operating System) and various application programs activated through a ROM (Read Only Memory) 61 and RAM (Random Access Memory) 62.

The service providing server 3 stores not only content data such as music, but also information related to the terminal 4 and user who owns the terminal 4 in a hard disk drive (HDD) 63. In response to a registration request or delete request issued from the terminal 4, the service providing server 3 registers or deletes the information related to the user or the terminal 4.

Upon receiving a transmission request of content data from the terminal 4 by a data communication processing section 64, the service providing server 3 uses information related to a user of the terminal 4 to perform user authentication. After performing predetermined settlement processing and the like, the service providing server 3 reads out the requested content data from the hard disk drive 63 and transmits the content data to the terminal 4.

(1-2) Circuit Configuration of Terminal

Figure 3:
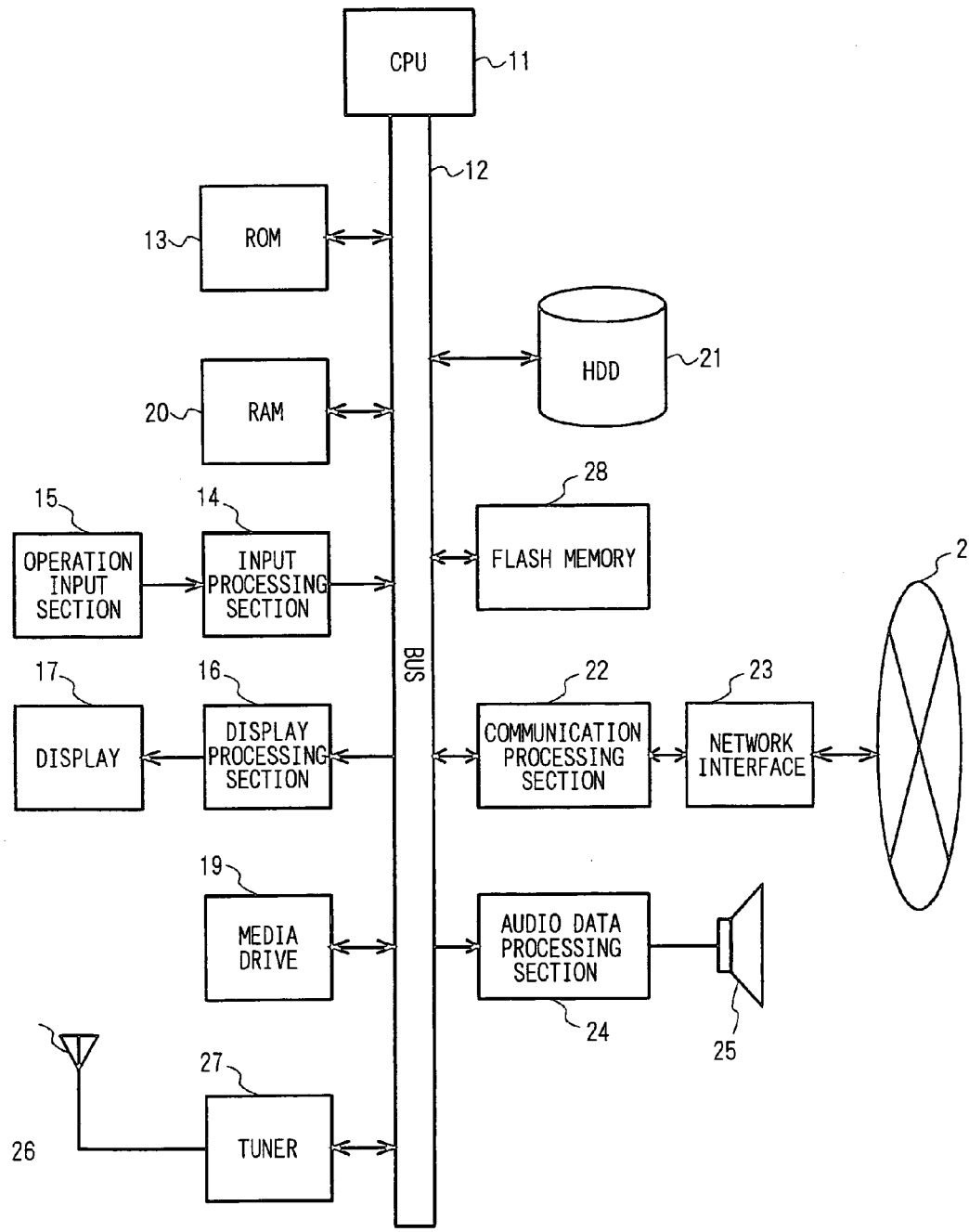
FIG. 3 is a schematic block diagram showing a circuit configuration of a terminal.

As shown in FIG. 3, a CPU 11 of the terminal 4 reads out a basic program such as an OS or the like and various application programs from a ROM 13 connected thereto through a bus 12, loads them into a RAM 20, and, based on the basic program and various applications, performs the entire control, predetermined computation processing, or the like. For example, the CPU 11 performs communication operation through a network 2, reception of an input/output operation from a user, reproduction of content from a medium, writing of content that has been downloaded from the service providing server 3 in a hard disk drive 21, and management of the above operations.

An operation input section 15 sends input information corresponding to a user's operation to various operating elements on a casing surface of the terminal main body or a remote-controller (which are not shown) to an input processing section 14, applies predetermined processing to the input information in the input processing section 14, and sends the resultant input information to the CPU 11 as an operation command. In response to the above operation, the CPU 11 performs processing corresponding to the operation command.

The display 17 may have a configuration in which a display device such as a liquid crystal display is directly attached to the casing surface of the terminal main body or may be configured as an external display device. The display 17 displays a processing result from the CPU 11 or various information.

A media drive 19 is, for example, a CD drive that reproduces a CD or a drive that reproduces Memory Stick™ which is a flash memory card. The media drive 19 applies digital/analog conversion processing to a reproduction result through an audio data processing section 24 and outputs the resultant reproduction result through a two-channel speaker 25.

In the case where the data reproduced through the media drive 19 is music audio content, the CPU 11 can store the content as an audio data file in the hard disk drive 21.

Further, the CPU 11 reads out a plurality of still images stored in the Memory Stick™ through the media drive 19 and sequentially displays, as a slide show, these still images on the display 17 through a display processing section 16.

Further the CPU 11 reads out a plurality of music pieces stored in the hard disk drive 21 and reproduces the music pieces in the user's preferred order like a jukebox.

A tuner section 27 is, for example, an AM and/or FM radio tuner. The tuner section 27 demodulates a broadcast signal received through an antenna 26 under the control of the CPU 11 and sends a result of the demodulation to the speaker 25 through the audio data processing section 24. The demodulation result is then output through the speaker 25.

A communication processing section 22 applies encoding processing to transmission data under the control of the CPU 11 and transmits the encoded transmission data to an external network-enabled device through a network interface 23 and the network 2, or applies decoding processing to reception data that has been received from an external network-enabled device through the network interface 23 and transfers the decoded reception data to the CPU 11.

(1-3) Content Directory Management

Figure 4:
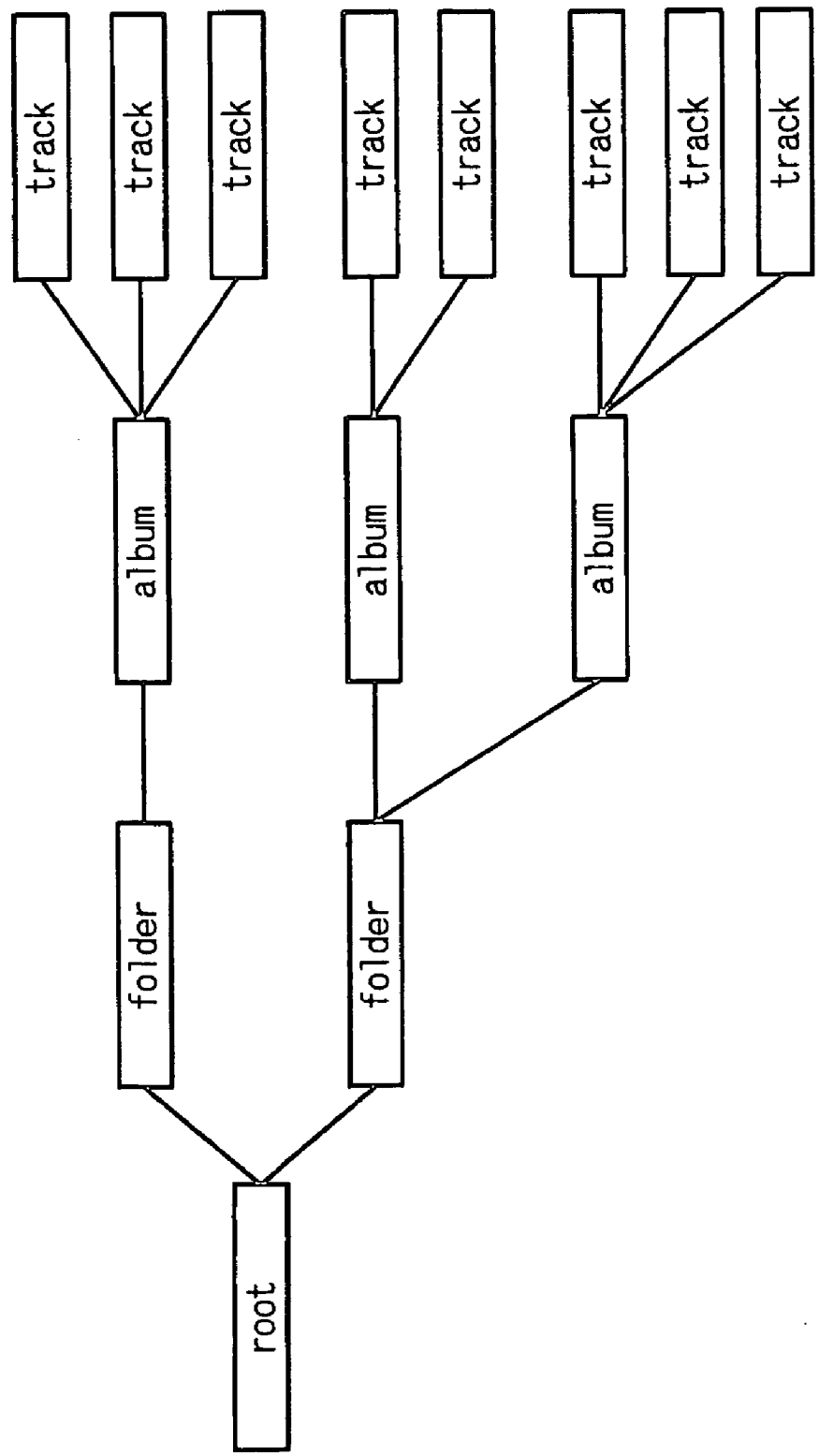
FIG. 4 is a schematic diagram showing a directory structure.

The CPU 11 of the terminal 4 manages contents stored in the hard disk drive 21 using the directory structure shown in FIG. 4. A given number of "folder" directories falling within a specified range are created under "root" directory. The "folder" directory corresponds, for example, to a category that content belongs to or an owner-user.

A given number of "album" directories falling within a specified range are created under the "folder" directories. The "album" directory corresponds, for example, to one album title. One or more "track" files which belong to the "album" directories are stored under each of the "album" directories. The "track" file corresponds to one song, i.e., one content.

The content directory management using the directory structure is performed by a database file stored in the hard disk drive 21.

(1-4) Program Module Configuration in Terminal

Figure 5:
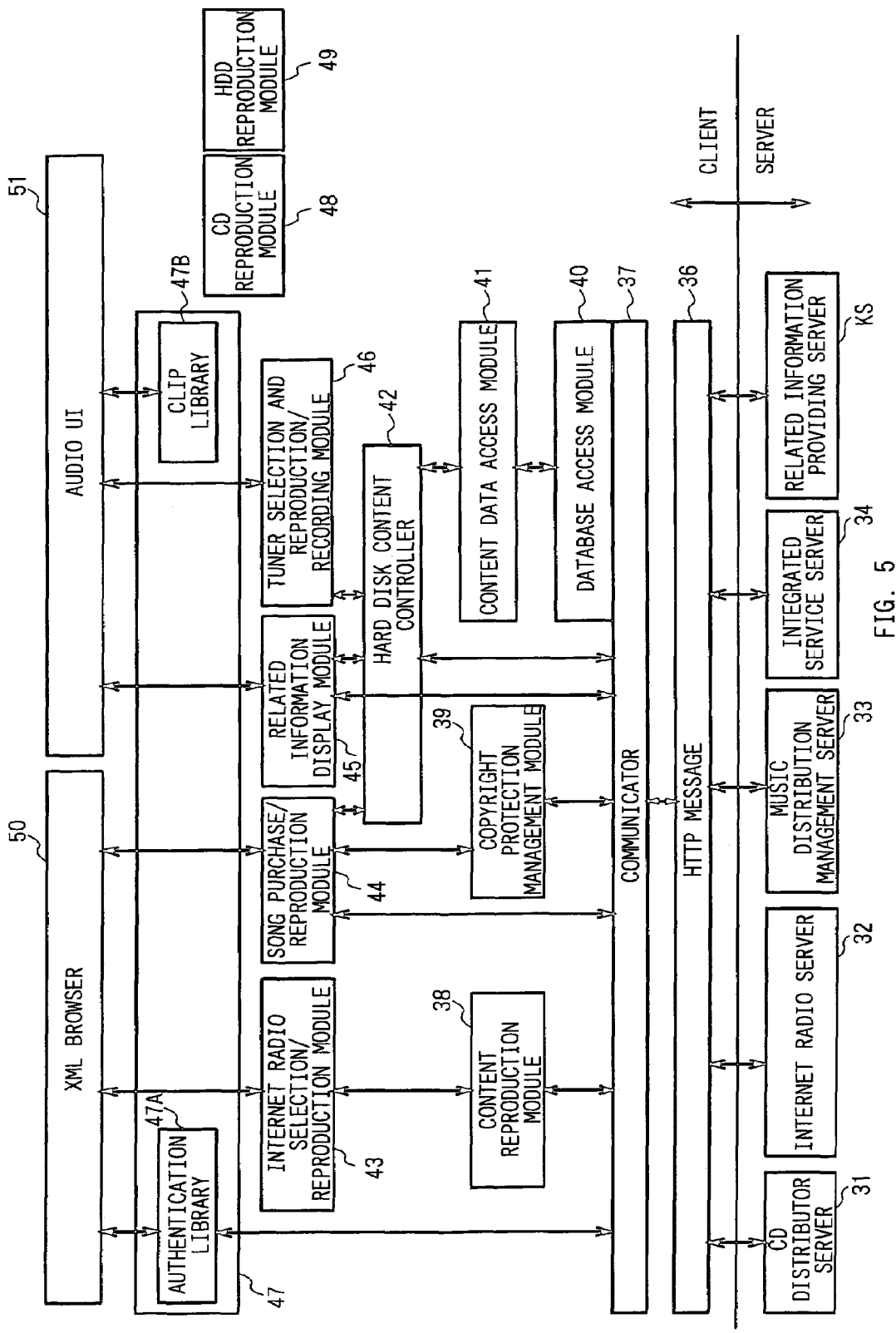
FIG. 5 is a schematic diagram showing program modules in the terminal.

As shown in FIG. 5, program modules of the terminal 4 are configured to run on an OS and communicate with various serves that constitute the service providing server 3, including a CD distributor server 31 that sells a CD, an internet radio server 32, a music distribution management server 33, an integrated service server 34, a related information providing server KS, and the like.

An HTTP (Hyper Text Transfer Protocol) massage program 36 allows the program modules in the terminal 4 to communicate with various servers including the CD distributor server 31, internet radio server 32, music distribution management server 33, integrated service server 34 for various services, related information providing server KS over HTTP communication. A communicator program 37 is a program module that exchanges data with the HTTP message program 36.

A content reproduction module 38 that interprets codec information of content to reproduce the content and a copyright protection management module 39 that handles information related to copyright protection are located above the communicator program 37. An internet radio selection/reproduction module 43 that selects internet radio stations and reproduces content therefrom and a song purchase/reproduction module 44 that controls purchase of songs and reproduction thereof are located so as to correspond to the content reproduction module 38 and copyright protection management module 39, respectively.

An XML (extensible Markup Language) browser 50 is located above the internet radio selection/reproduction module 43 and song purchase/reproduction module 44. The XML browser 50 interprets an XML file from the various servers and displays the interpretation result on the display 17.

For example, the song that a user has selected on the XML browser 50 is purchased by the song purchase/reproduction module 44 and written into the hard disk drive 21 (FIG. 3) through a hard disk content controller 42.

An authentication library 47A of a library 47 is connected to the communicator program 37. The authentication library 47A performs authentication processing for the integrated service server 34 and other various servers.

Further, a database access module 40, content data access module 41, and hard disk content controller 42 are located above the communicator program 37.

The database access module 40 accesses various databases built in the hard disk drive 21, the content data access module 41 accesses contents stored in the hard disk drive 21, and the hard disk content controller 42 manages contents stored in the hard disk drive 21.

A related information display module 45 for displaying the title and artist name of the song broadcasted by a radio station (not shown) is located above the hard disk, content controller 42. Further, a tuner selection and reproduction/recording module 46 that selects radio stations and records the content of the song received from the selected radio station in the hard disk drive 21 is located above the hard disk content controller 42.

For example, the song that has been received from the selected radio station through an audio user interface (UI) 51 is written into the hard disk drive 21 through the content data access module 41.

The related information display module 45 receives, as song-related information, the title and artist name of the song being broadcasted by a radio station selected by the tuner selection and reproduction/recording module 46 from a related information service server KS through the HTTP message program 36 and displays it on the display 17 through the audio user interface 51.

The related information that has been displayed on the display 17 through the audio user interface 51 can temporarily be stored in a clip library 47B of the library 47 and eventually be stored in the hard disk drive 21 through the database access module 40 according to a user's instruction.

The program module of the client terminal 4 further includes a CD reproduction module 48 for reproducing a CD and an HDD reproduction module 49 for reproducing the hard disk drive 21, and the reproduction result thereof is output through the audio data processing section 24 and speaker 25.

(2) Storage of User Information

The terminal 4 stores various information related to the terminal 4 and a user thereof in the hard disk drive 21, RAM 20 and flash memory 28 depending on the type thereof.

As shown in FIG. 6, the terminal 4 stores, in the hard disk drive 21, the machine name set for a user to identify the terminal 4, a bookmark corresponding to the URL (Uniform Resource Locator) of Web page that the user frequently visits, service providing information, which is one of the various information provided for the user through the service, indicating information related to a category that the user has selected in accordance with his or her preference, and FEP learning information of a FEP (Front End Processor) for the user to perform kana-kanji conversion in inputting Japanese.

The terminal 4 stores and updates the above machine name, book mark, service providing information, and FEP learning information (hereinafter, which are collectively referred to as user utilization information) according to a user's operation, thereby improving the usability of the terminal 4.

Further, the terminal 4 automatically stores, in the hard disk drive 21, a network use setting such as a host name of a provider for use in connecting the terminal 4 to the Internet 2 and a key input pattern which is user's key input characteristics learned by predetermined processing, as needed.

The terminal 4 thus automatically stores and updates the network use setting and key input pattern (hereinafter, which are collectively referred to as user-specific information), to thereby acquire characteristics of the user and network without user's consciousness. Further, the terminal 4 compares newly acquired user-specific information and already stored user-specific information to thereby detect a change of user or a change in the network.

Further, the terminal 4 stores user authentication information (user ID and password) in the RAM 20 and automatically transmits the user authentication information for acquisition of content data or the like from the service providing server 3 to thereby cut out the need for the user to input the user authentication information.

In the terminal 4, the information such as the machine name stored in the non-volatile hard disk drive 21 is stored unless it is deleted by predetermined delete operation; whereas the user authentication information stored in the RAM 20, which is volatile, is deleted at the time point when a power is off.

As described above, the terminal 4 is configured to store the user utilization information, user-specific information, and user authentication information.

(3) Storage and Deletion of Information

A description will next be given of processing in which the terminal 4 stores or deletes various information related to the terminal 4 and a user thereof.

(3-1) Service Sign-Up

When, for example, a user who has not signed-up for a service purchases the terminal 4 in order to use the service utilizing system 1, the user operates the terminal 4 to sign-up for the service. A description will hereinafter be given of service sign-up processing performed at this time.

Figure 7:
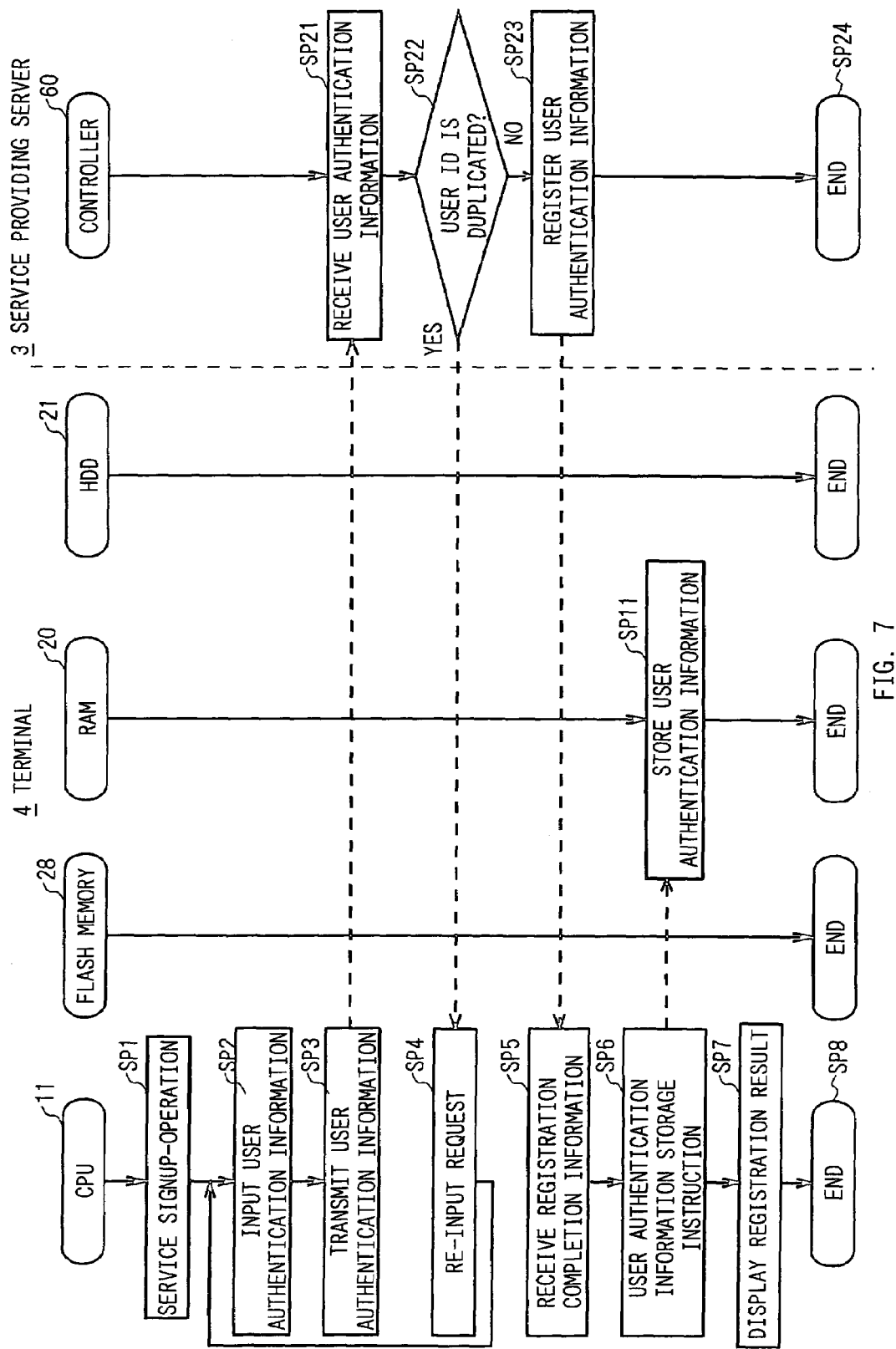
FIG. 7 is a schematic diagram showing a service admission sequence.

As shown in FIG. 7, in step SP1, the CPU, 11 of the terminal 4 receives a predetermined service sign-up operation from the user and advances to step SP2.

In step SP2, the CPU 11 receives an input of user's desired user ID and user specified password (i.e., user authentication information) in response to a user's operation and advances to step SP3.

In step SP3, the CPU 11 transmits the user authentication information to the service providing server 3 through the internal components including communication processing section 22, network interface 23, and the like and the Internet 2.

An SSL (Secure Socket Layer) is used in all communication interactions, between the terminal 4 and service providing server 3, thereby preventing information from being leaked to a third party.

Then, in step SP21, the controller 60 of the service providing server 3 receives the user authentication information transmitted from the terminal 4 by the data communication processing section 64 (FIG. 2) and advances to step SP22.

In step SP22, the controller 60 determines whether the user ID included in the received user authentication information is duplicated with the user ID of another user that has been registered in the hard disk drive 63. When it is determined to be NO, it means that the received user ID can be registered in this service and, accordingly, the controller 60 advances to step SP23.

On the other hand, when it is determined to be YES in step S22, it means that the received user ID has already been registered as the user ID of another user and cannot be used and, accordingly, the controller 60 of the service providing server 3 notifies the terminal 4 of the duplication of the user ID. Upon receiving the notification, in step SP4, the CPU 11 of the terminal 4 prompts the user to input a different user ID once again and returns to step SP 2.

In step SP23, the controller 60 performs registration operation to store the user ID and password received from the terminal 4 in the hard disk drive 63, transmits registration completion information to the terminal 4, and advances to SP24, where the controller 60 ends the service sign-up processing to be performed by the controller 60.

The CPU 11 of the terminal 4 then receives the registration completion information transmitted from the service providing server 3 in step SP5 and advances to step SP6.

In step SP6, the CPU 11 issues an instruction to the RAM 20 to store the user authentication information. Accordingly, in step SP11, the RAM 20 stores the user authentication information and the CPU 11 then advances to step SP7.

In step SP7, the CPU 11 displays that the user ID has been registered on the display 17 to notify the user of that fact and advances to step SP8, where the CPU 11 ends this service sign-up processing.

(3-2) Service Login

The user who has signed-up for the service needs to login to the service by operating the terminal 4 when receiving the service. A description will next be given of service login processing performed at this time.

Figure 8:
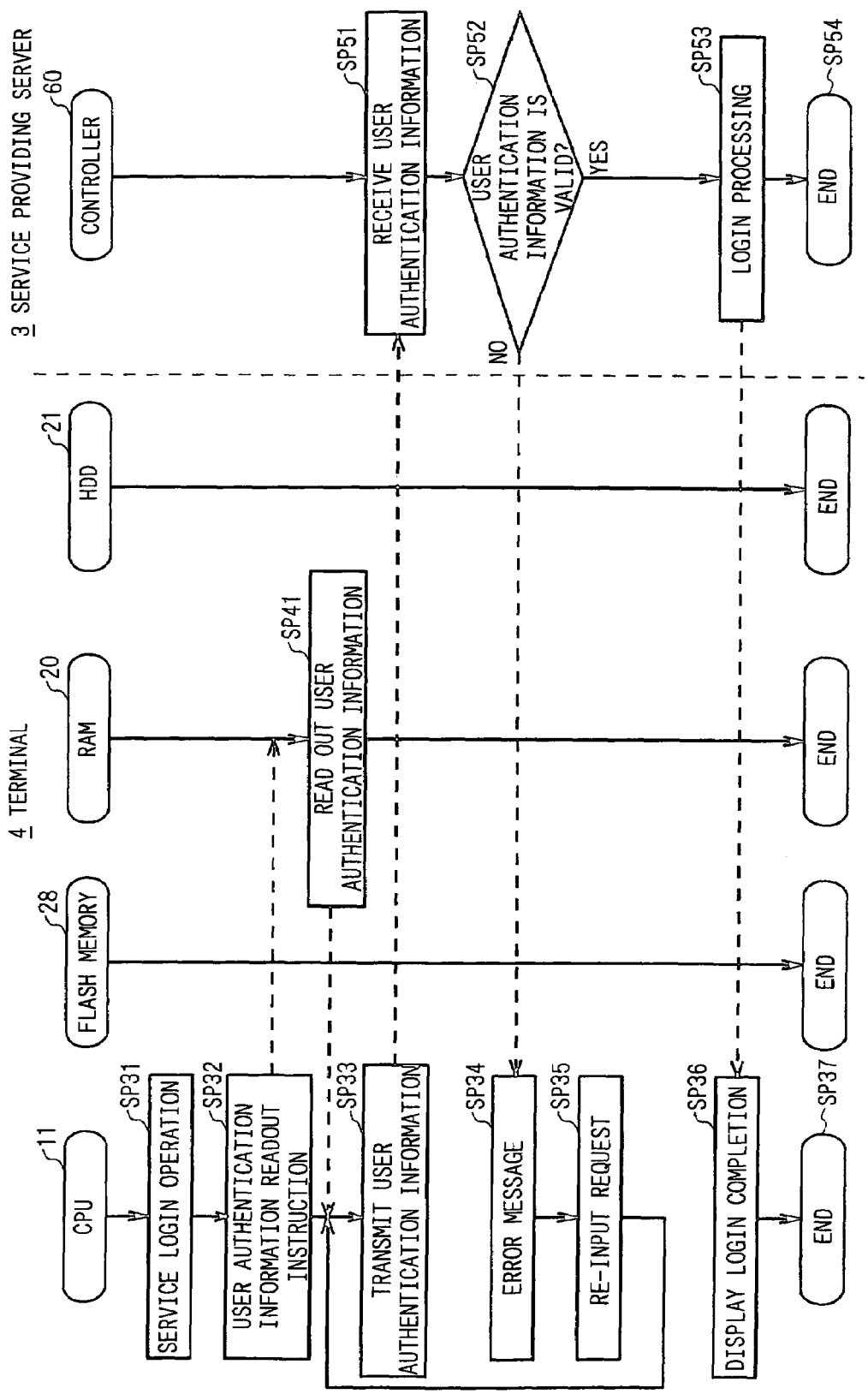
FIG. 8 is a schematic diagram showing a service login sequence.

As shown in FIG. 8, in step SP31, the CPU 11 of the terminal 4 receives a predetermined service login operation made by the user and advances to step SP32.

In step SP32, the CPU 11 issues an instruction to read out user authentication information. Accordingly, in step SP 41, the user authentication information is read out from the RAM 20 and the CPU 11 then advances to step SP33.

In step SP33, the CPU 11 transmits the user authentication information to the service providing server 3.

Then the controller 60 of the service providing server 3 receives the user authentication information transmitted from the terminal 4 in step SP51 and advances to step SP52.

In step SP52, the controller 60 determines whether the user ID and password included in the received user authentication information correspond to those registered in the hard disk drive 63.

When it is determined to be NO in step SP52, it means that the user authentication information is not valid and, accordingly, the controller 60 notifies the terminal 4 of a failure of the user authentication upon receiving the notification, the CPU 11 of the terminal 4 displays on the display 17 that the user authentication has failed to notify the user of that fact in step SP34, prompts the user to input the correct user ID and password in step SP35, and returns to step SP33.

On, the other hand, it is determined to be YES in step SP52, the controller 60 advances to step SP53. In step SP53, the controller 60 performs predetermined login processing, transmits login completion information indicating that the login processing has been completed to the terminal 4, and advances to step SP54, where the controller 60 ends this service login processing to be performed in the service providing server 3.

In step SP36, upon receiving the login processing completion information from the service providing server 3, the CPU 11 of the terminal 4 displays the completion information on the display 17 to notify the user of that fact and advances to step SP37, where the CPU 11 ends this service login processing.

(3-3) Apparatus Name Registration Processing

As described above, the user assigns a given machine name to the terminal 4 and the service providing server 3 uses the machine name to identify the terminal 4.

A description will next be given of machine name registration processing for assigning a machine name to the terminal 4 and registering it.

Figure 9:
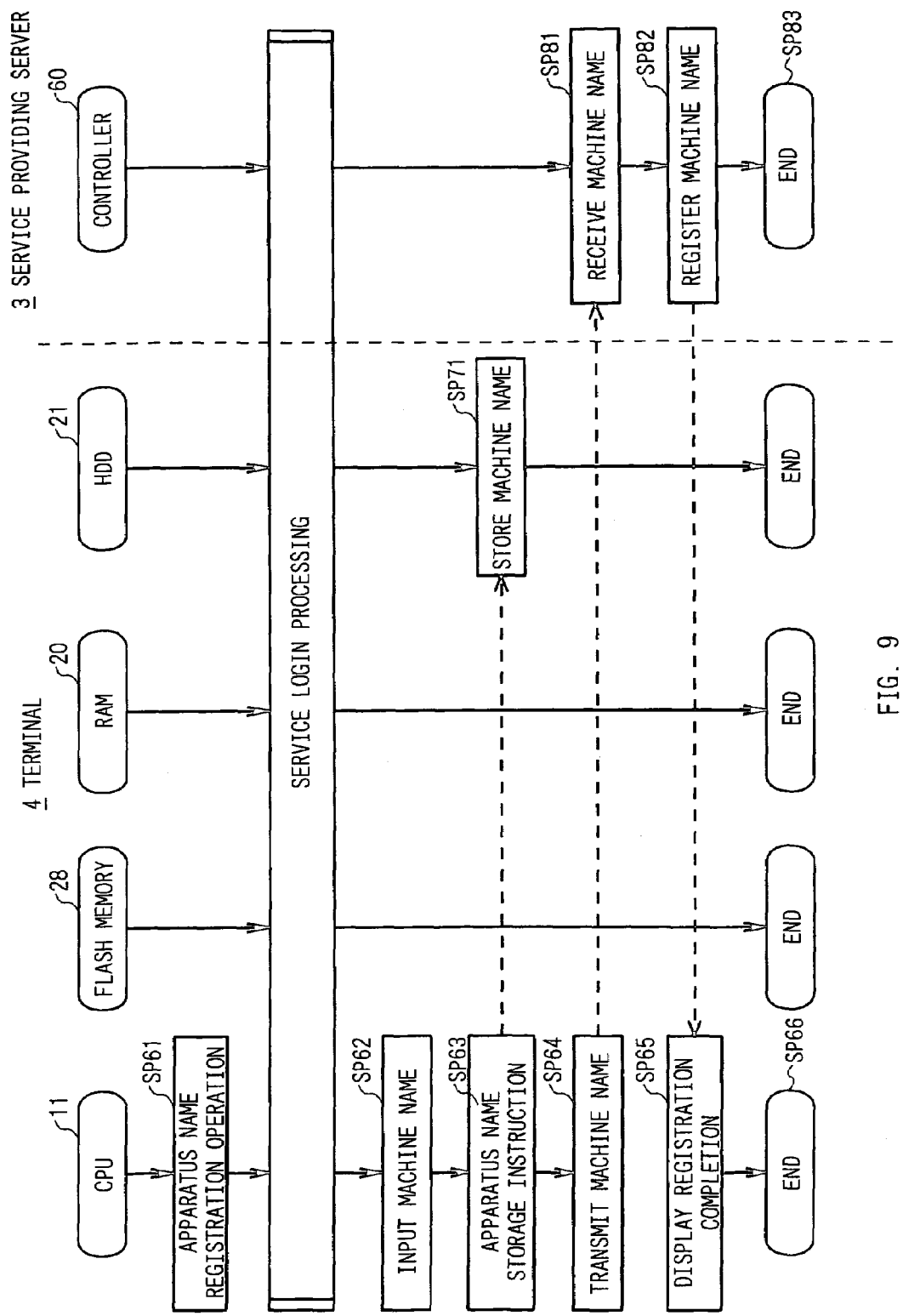
FIG. 9 is a schematic diagram showing a machine name registration sequence.

As shown in FIG. 9, upon receiving a predetermined machine name registration operation made by the user in step SP61, the CPU 11 of the terminal 4 performs the abovementioned service login processing to login to the service and, advances to step SP62.

In step SP62, the CPU 11 allows the user to input the machine name and advances to step SP63.

In step SP63, the CPU 11 issues an instruction to the hard disk drive 21 to store the machine name input by the user.

Accordingly, in step SP 71, the hard disk drive 21 stores the machine name and the CPU 11 then advances to step SP64.

In step SP64, the CPU 11 transmits the machine name to the service providing server 3.

Then the controller 60 of the service providing server 3 receives the machine name from the terminal 4 in step SP81 and advances to step SP82.

In step SP82, the controller 60 registers the received machine name in the hard disk drive 63, transmits registration completion information indicating that the registration of the machine name has been completed to the terminal 4, and advances to step SP83, where the controller 60 ends this machine name registration processing to be performed by the controller 60.

Incidentally, in the service providing system 1, the service providing server 3 manages the user ID and machine name by associating them with each other. Therefore, duplication of the machine name between a plurality of terminals 4 that one user owns is not allowed; whereas the duplication between terminals 4 which belong respectively to different users is allowed.

The CPU 11 of the terminal 4 then receives the registration completion information in step SP65, displays that the registration of the machine name has been completed on the display 17 to notify the user of that fact, and advances to step SP66, where the CPU 11 ends this apparatus registration processing.

(3-4) Bookmark Registration

A description will next be given of bookmark registration processing performed by the user.

Figure 10:
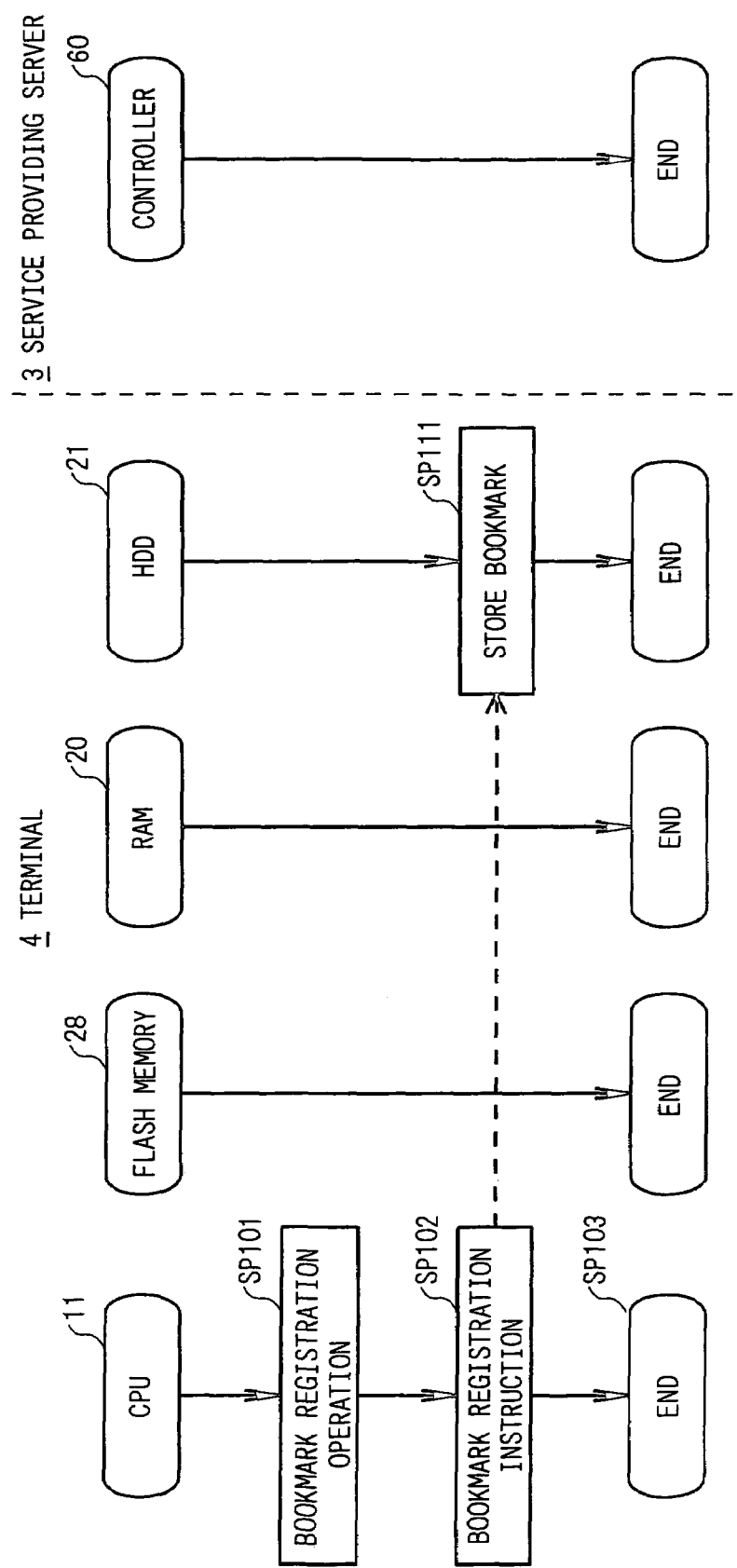
FIG. 10 is a schematic block diagram showing a bookmark registration sequence.

As shown in FIG. 10, in step SP101, the CPU 11 of the terminal 4 receives a predetermined bookmark registration operation in a state where the user selects, on a web browser, a Web page that he or she wants to register and advances step SP102.

In step SP102, the CPU 11 issues an instruction to the hard disk drive 21 to register the title, URL, or the like of the selected web page as a bookmark. Accordingly, in step SP111, the hard disk drive 21 that has received the instruction stores the bookmark and the CPU 11 then advances to step SP103, where the CPU 11 ends this bookmark registration sequence.

(3-5) Service Providing Information Registration

A description will next be given of service providing information registration processing. The service providing information is one of the various information provided for the user through the service. Through this processing, the user can selectively acquire only information related to a category that the user has selected in accordance with his or her preference from the various information.

Figure 11:
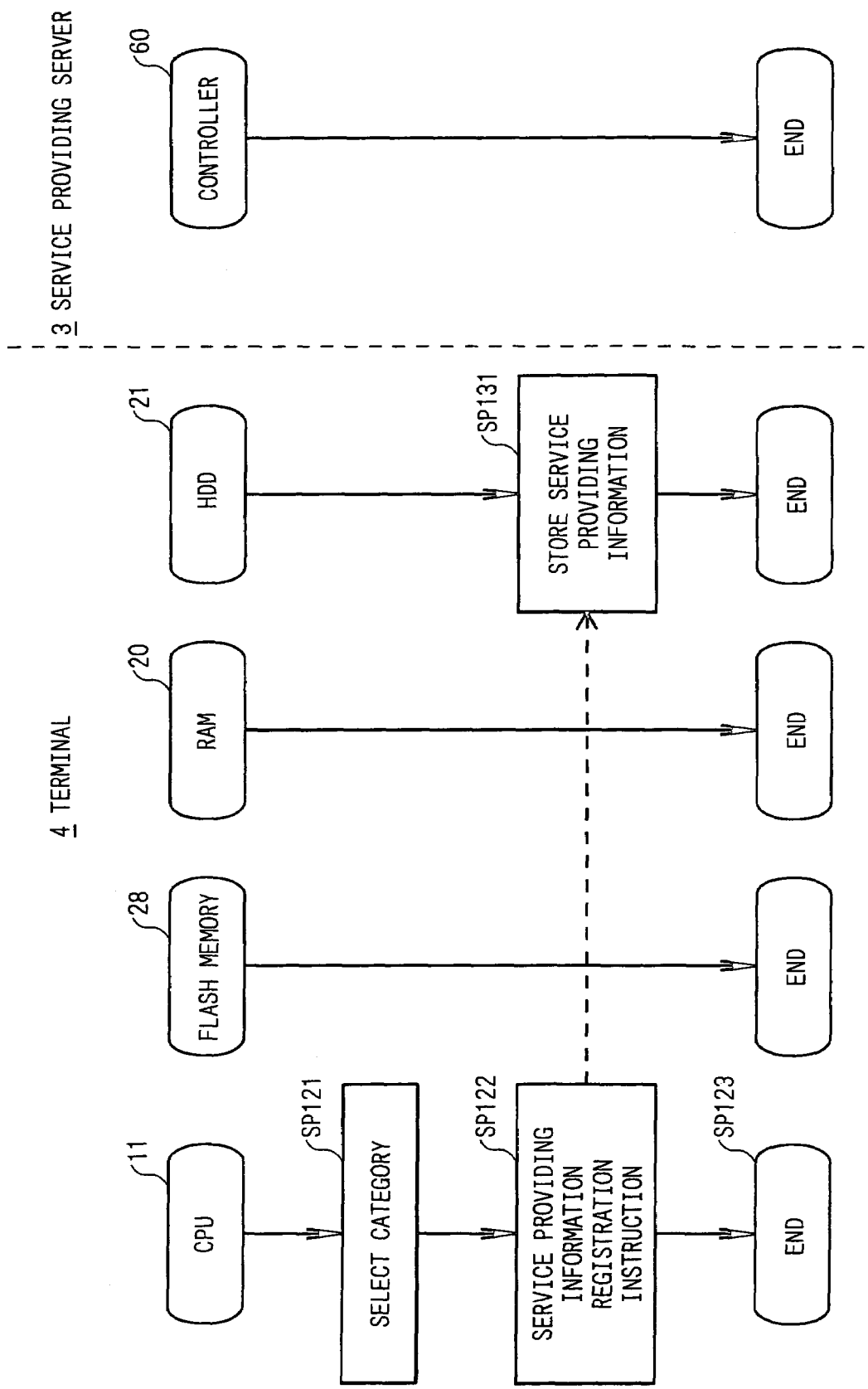
FIG. 11 is a schematic diagram showing a service providing information registration sequence.

As shown in FIG. 11, the CPU 11 of the terminal 4 allows the user to select a category of desired information through a predetermined input operation in step SP121 and advances to step SP122.

In step SP122, the CPU 11 issues an instruction to the hard disk drive 21 to register the service providing information consisting of the selected category. Accordingly, in step SP 131, the hard disk drive 21 that has received the instruction stores the service providing information and the CPU 11 advances to step SP123, where the CPU 11 ends this service providing information registration sequence.

(3-6) FEP Learning Information Registration

A description will next be given of FEP leaning information registration processing. The FEP learning information is information obtained by automatically learning user's conversion patterns each time the user uses the FEP for inputting Japanese.

Figure 12:
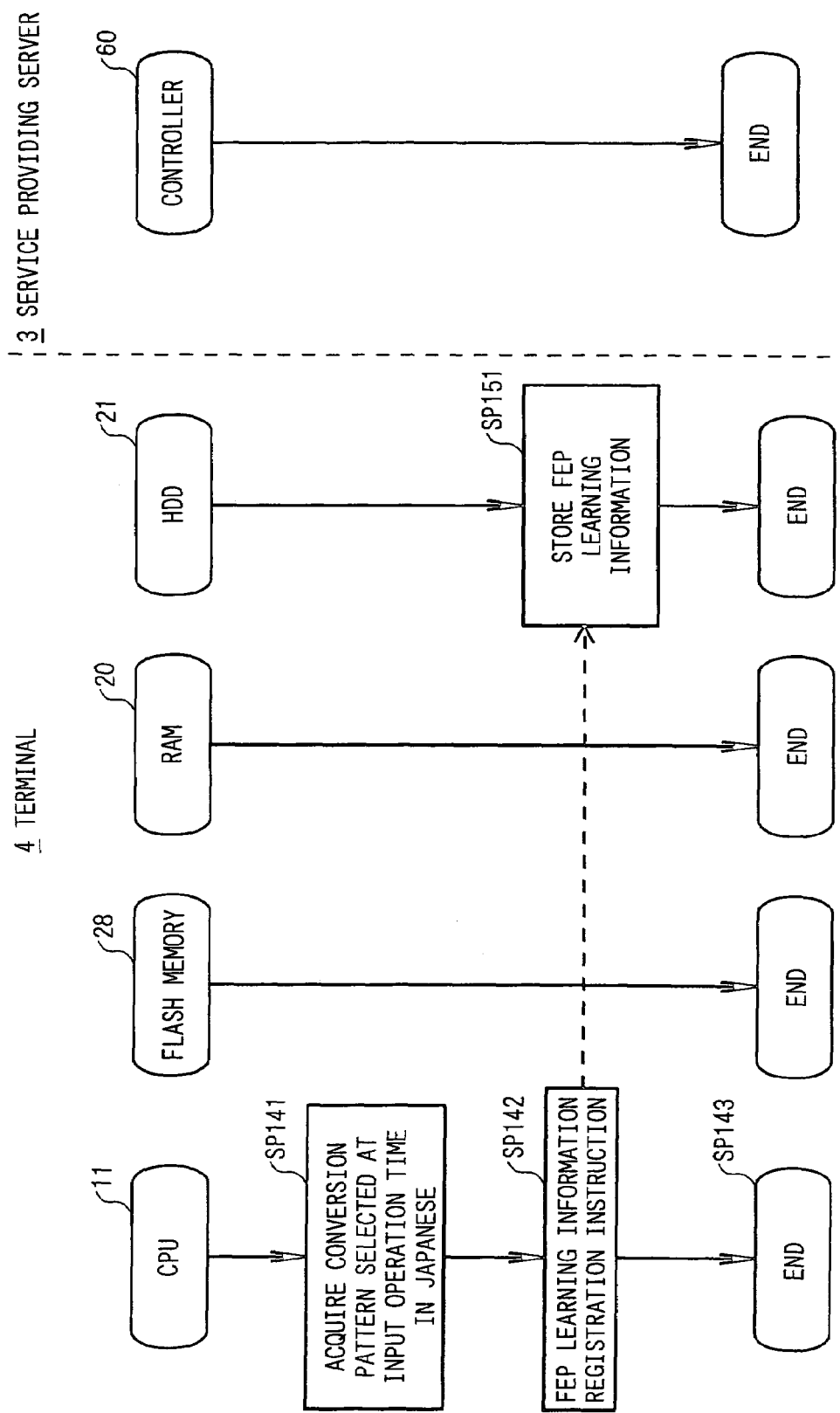
FIG. 12 is a schematic diagram showing a FEP learning information registration sequence.

As shown in FIG. 12, the CPU 11 of the terminal 4 automatically acquires, as FEP learning information, a conversion pattern selected by the user at the time of input operation in Japanese in step SP141 and advances to step SP142.

In step SP142, the CPU 11 issues an instruction to the hard disk drive 121 to register the FEP learning information. Accordingly, in step SP151, the hard disk drive 21 that has received the instruction stores the FEP learning information and the CPU 11 then advances to step SP143, where the CPU 11 ends this FEP learning information registration sequence.

(3-7) Withdrawal from Service

A description will next be given of service withdrawal processing performed when the user withdraws from the service. At this time, the user information registered in the terminal 4 is deleted.

Figure 13:
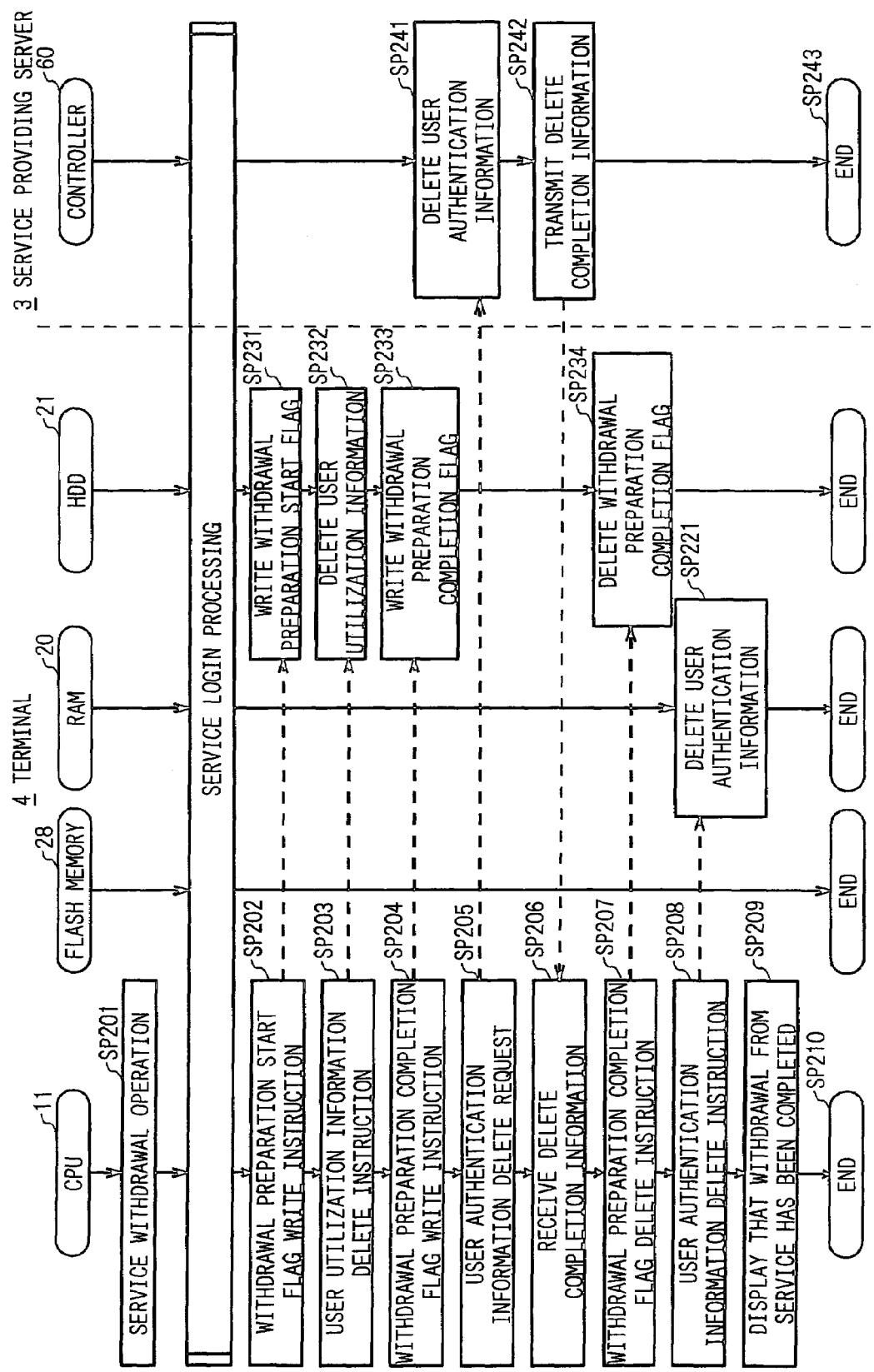
FIG. 13 is a schematic diagram showing a service withdrawal sequence.

As shown in FIG. 13, upon receiving a predetermined service withdrawal operation from the user in step SP201, the CPU 11 of the terminal 4 performs the abovementioned service login processing to login to the service and advances to step SP202.

In step SP202, the CPU 11 issues an instruction to the hard disk drive 21 to write a withdrawal preparation start flag indicating that a preparation of service withdrawal has been started. Accordingly, in step SP231, the hard disk drive 21 writes the withdrawal preparation start flag in and the CPU 11 then advances to step SP203.

If the service withdrawal processing is interrupted due to, for example, power disconnection, the terminal 4 can continue the service withdrawal processing after power recovery by using the withdrawal preparation start flag and a withdrawal preparation completion flag (to be described later).

In step SP203, the CPU 11 issues an instruction to the hard disk drive 21 to delete the registered user information (machine name, bookmark, service providing information, FEP learning information, etc). Accordingly, in step SP232, the hard disk drive 21 deletes the user information and the CPU 11 advances to step SP204.

In step SP204, the CPU 11 issues an instruction to the hard disk drive 21 to write a withdrawal preparation completion flag indicating that a preparation of service withdrawal has been completed. Accordingly, in step SP233, the hard disk drive 21 writes the withdrawal preparation completion flag and the CPU 11 then advances to step SP205.

In step SP205, the CPU 11 transmits a request of deleting the user authentication information registered in the service providing server 3 to the service providing server 3.

Then the controller 60 of the service providing service 3 receives the user authentication information delete request transmitted from the terminal 4 in step SP241 deletes the user authentication information (user ID and password) authenticated in the service login processing and information related to the terminal 4, such as machine name, registered in association with the user ID, and advances to step SP242.

In step SP 242, the controller 60 transmits delete completion information indicating that the deletion of the user authentication information has been completed to the terminal 4 and advances to step SP 243, where the controller 60 ends this service withdrawal processing to be performed in the service providing server 3.

Then the CPU 11 of the terminal 4 receives the delete completion information from the service providing server 3 in step SP206 and advances to step SP207.

In step SP207, the CPU 11 issues an instruction to the hard disk drive 21 to delete the stored withdrawal preparation completion flag. Accordingly, in step SP234, the hard disk drive 21 deletes the withdrawal preparation completion flag and the CPU 11 then advances to step SP208.

In step SP208, the CPU 11 issues an instruction to the RAM 20 to delete the stored user authentication information. Accordingly, in step SP221, the RAM 20 deletes the user authentication information and the CPU 11 then advances to step SP209.

In step SP209, the CPU 11 displays that the withdrawal from the service has been completed on the display 17 to notify the user of that fact and advances to step SP210, where the CPU 11 ends this service withdrawal processing.

(3-8) Deletion of Terminal

A description will next be given of terminal delete processing. The terminal delete processing is performed when, for example, a given user, who owns a plurality of terminals 4 and hands over one terminal 4 to another user, needs to exclude only the one terminal 4 from the service without canceling the user's membership to the service.

Figure 14:
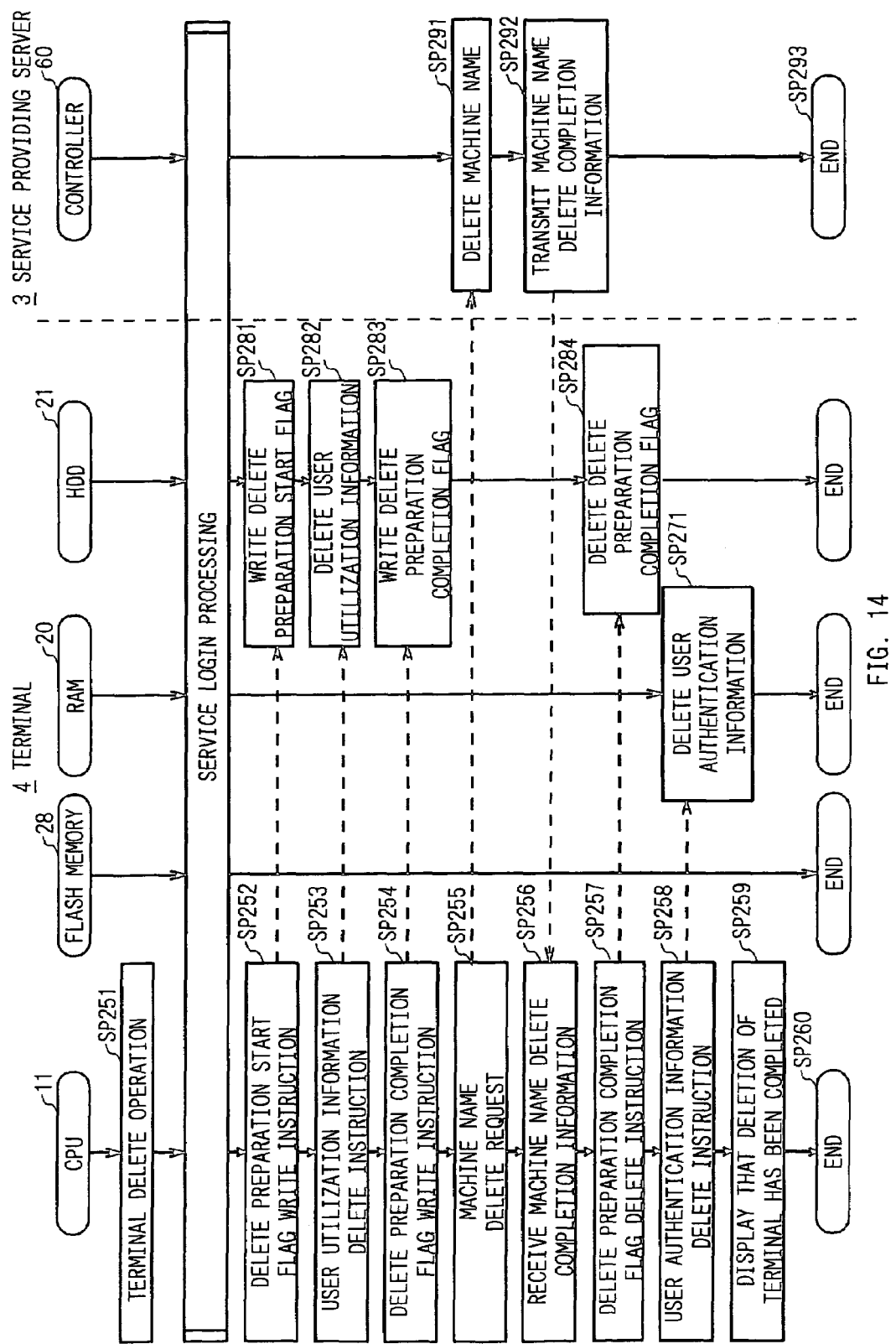
FIG. 14 is a schematic diagram showing a terminal delete sequence.

As shown in FIG. 14, upon receiving a predetermined terminal delete operation from the user in step SP251, the CPU 11 of the terminal 4 performs the abovementioned service login processing to login to the service and advances to step SP252.

In step SP252, the CPU 11 issues an instruction to the hard disk drive 21 to write a delete preparation start flag indicating that a preparation of the terminal delete has been started. Accordingly, in step SP281, the hard disk drive 21 writes the delete preparation start flag and the CPU 11 then advances to step SP253.

In step SP253, the CPU 11 issues an instruction to the hard disk drive 21 to delete the registered user utilization information (machine name, bookmark, service providing information, FEP learning information, etc). Accordingly, in step SP282, the hard disk drive 21 deletes the user utilization information and the CPU 11 then advances to step SP254.

In step SP254, the CPU 11 issues an instruction to the hard disk drive 21 to write a delete preparation completion flag indicating that a preparation of terminal delete has been completed. Accordingly, in step SP283, the hard disk drive 21 writes the delete preparation completion flag and the CPU 11 then advances to step SP 255.

In step SP255, the CPU 11 transmits a request of deleting the machine name registered in the service providing server 3 to the service providing server 3.

Then the controller 60 of the service providing server 3 receives the machine name delete request transmitted from the terminal 4 in step SP291, deletes the machine name of the terminal 4 registered in the hard disk drive 63, and advances to step SP292.

In step SP292, the controller 60 transmits machine name delete completion information indicating that a deletion of machine name has been completed to the terminal 4 and advances to step SP293, where the controller 60 ends this terminal delete processing to be performed in the service providing server 3.

Then the CPU 11 of the terminal 4 receives the machine name delete completion information transmitted from the service providing server 3 in step SP256 and advances to step SP257.

In step SP257, the CPU 11 issues an instruction to the hard disk drive 21 to delete the delete preparation completion flag. Accordingly, in step SP284, the hard disk drive 21 deletes the delete preparation completion flag and the CPU 11 then advances to step SP258.

In step SP258, the CPU 11 issues an instruction to the RAM 20 to delete the stored user authentication information. Accordingly, in step SP271, the RAM 20 deletes the user authentication information and the CPU 11 then advances to step SP259.

In step SP259, the CPU 11 displays that the deletion of the terminal has been completed to notify the user of that fact and advances to step SP260, where the CPU 11 ends this terminal delete processing.

(3-9) Response to User's Change

A description will next be given of processing for responding key input pattern change, in which the user information stored (registered) in the terminal 4 and service providing server 3 is deleted in the case where the terminal 4 detects a change of a user based on detection of a key input pattern change.

Figure 15:
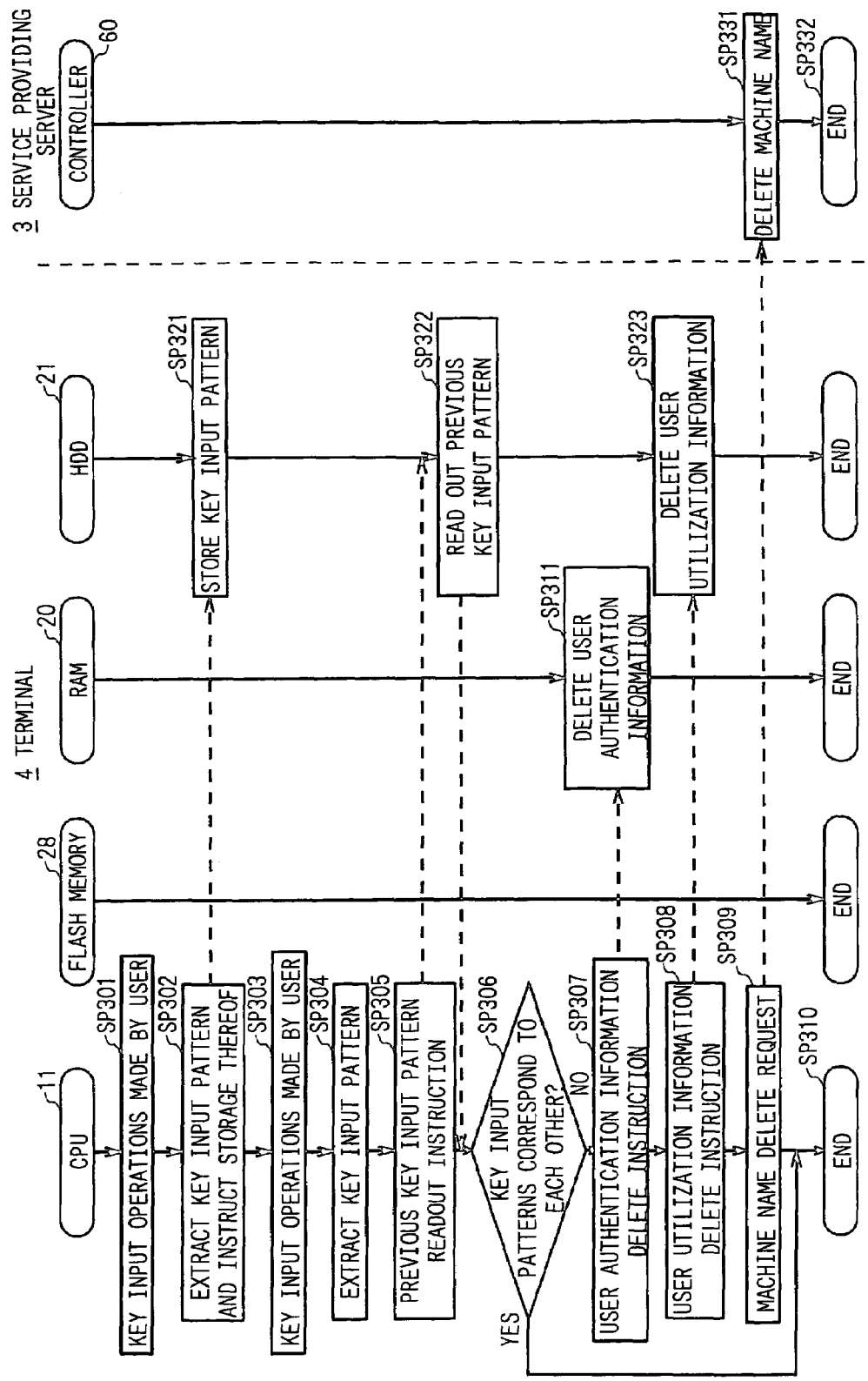
FIG. 15 is a schematic diagram showing a sequence for responding a key input pattern change.

As shown in FIG. 15, the CPU 11 of the terminal 4 receives key inputs corresponding to various operations made by the user in step SP301 and advances to step SP302.

In step SP302, the CPU 11 extracts a key input pattern based on predetermined processing, issues an instruction to the hard disk drive 21 to store the key input pattern. Accordingly, in step SP321, the hard disk drive 21 stores the key input pattern and the CPU 11 then advances to step SP303.

In step SP303, the CPU 11 receives key inputs corresponding to various operations made by the user in step SP303 and advances to step SP304.

In step SP304, the CPU 11 extracts a new key input pattern based on predetermined processing and advances to step SP305.

In step SP305, the CPU 11 issues an instruction to read out a previous key input pattern stored in the hard disk drive 21. Accordingly, in step SP322, the previous key input pattern is read out from the hard disk drive 21 and the CPU 11 then advances to step SP306.

In step SP306, the CPU 11 determines whether the new key input pattern and previous key input pattern correspond to each other. When it is determined to be YES, it means that a current user corresponds to a previous user, that is, the user information need not be deleted and, accordingly, the CPU 11 advances to step SP310, where the CPU 11 ends this processing for responding key input pattern change.

On the other hand, when it is determined to be NO in step SP306, it means that a current user does not corresponds to a previous user and therefore the user information corresponding to the previous user needs to be deleted and, accordingly, the CPU 11 advances to step SP307.

In step SP307, the CPU 11 issues an instruction to the RAM 20 to delete the user authentication information. Accordingly, in step SP311, the RAM 20 deletes the user authentication information and the CPU 11 then advances to step SP308.

In step SP308, the CPU 11 issues an instruction to the hard disk drive 21 to delete the user utilization information. Accordingly, in step SP323, the hard disk drive 21 deletes the user utilization information and the CPU 11 then advances to step SP309.

At this time, the CPU 11 also deletes the key input pattern stored in the hard disk drive 21.

In step SP309, the CPU 11 transmits a request of deleting the user authentication information registered in the service providing server 3 to the service providing server 3 and advances to step SP 310, where the CPU 11 ends this processing for responding key input pattern change to be performed in the terminal 4.

Then the controller 60 of the service providing server 3 receives the machine name delete request transmitted from the terminal 4 in step SP331, deletes the machine name of the terminal 4 registered in the hard disk drive 63, and advances to step SP33, where the controller 60 ends this processing for responding key input pattern change.

(3-10) Response to Network Change

A description will next be given of processing for responding network change, in which the terminal 4 determines that a user is changed to another one when detecting a change in a network use setting and deletes the user information.

Figure 16:
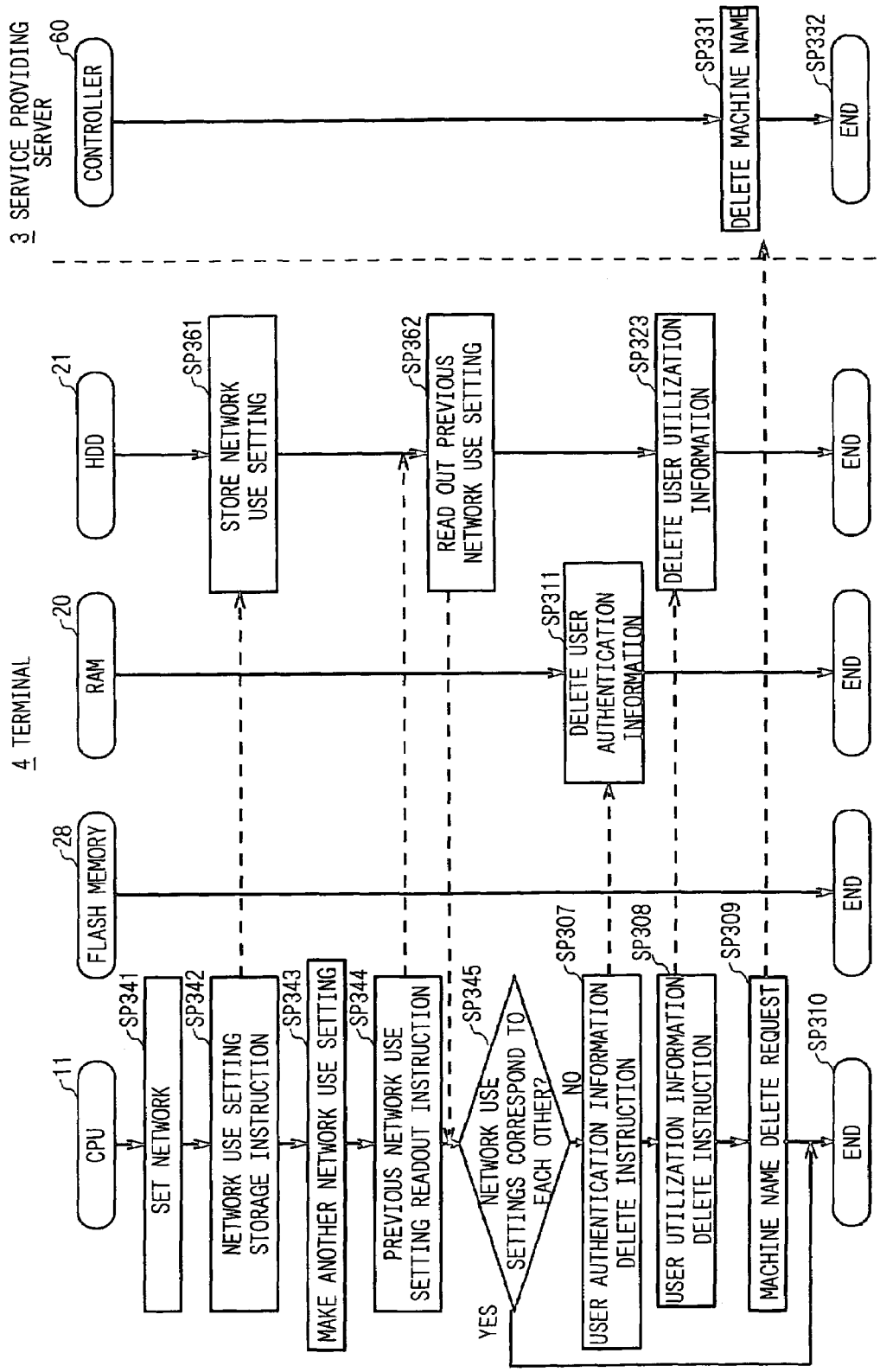
FIG. 16 is a schematic diagram showing a sequence for responding a network change.

As shown in FIG. 16, in which the same reference numerals as those in FIG. 15 denote the corresponding parts as those in FIG. 16, the CPU 11 of the terminal 4 sets a network based on a user's operation or the like in step SP341 and advances to step SP342.

In step SP342, the CPU 11 issues an instruction to the hard disk drive 21 to store the network use setting. Accordingly, in step SP361, the hard disk drive 21 stores the network use setting and the CPU 11 then advances to SP 343.

In step SP343, the CPU 11 makes another network use setting based on a user's operation or the like and advances to step SP344.

In step SP344, the CPU 11 issues an instruction to read out a previous network use setting stored in the hard disk drive 21. Accordingly, in step, SP362, the previous network use setting is readout from the hard disk drive 21. Then the CPU 11 advances to step SP345.

In step SP345, the CPU 11 determines whether a current network use setting and previous network use setting correspond to each other. When it is determined to be YES, it means that a current installation location of the terminal 4 is not likely to be changed and therefore a user is not very likely to be changed and, accordingly, the CPU 11 advances to step SP346, where the CPU 11 ends this processing for responding network change.

On the other hand, when it is determined to be NO in step SP345, it means that a current installation location of the terminal 4 is likely to differ from a previous installation location of the terminal 4 and therefore a current user is very likely to differ from a previous user. That is, the user information corresponding to the previous user needs to be deleted and, accordingly, the CPU 11 advances to step SP307.

The CPU 11 performs the abovementioned steps SP307-SP308-SP309-SP310 and steps SP311, SP323, SP331, and SP332 to delete the user authentication information in the RAM 20, the user utilization information and network use setting in the hard disk drive 21, and machine name registered in the service providing server 3 and ends this processing for responding network change.

(4) Operation and Effect

With the above configuration, the terminal 4 stores, as the user authentication information, the user ID and password in the RAM 20 and stores, as the user utilization information, the machine name, bookmark, service providing information, and FEP learning information in the hard disk drive 21.

Further, the terminal 4 automatically stores, as the user-specific information, the key input pattern and network use setting in the hard disk drive 21. At the same time, the terminal 4 compares the user-specific information with previous user-specific information as needed to determine whether a user has been changed or not.

When detecting a change of a user based on the user-specific information, and when receiving the service withdrawal operation or terminal delete operation, the terminal 4 deletes the user authentication information stored in the RAM 20, deletes the user utilization information and user-specific information stored in the hard disk drive 21, as well as requests a deletion of the machine name of the terminal 4 registered in the service providing server 3 to allow the machine name to be deleted.

Therefore, in the case where the user withdraws from the service or whether the terminal delete processing in which the terminal 4 is excluded from the service, the terminal 4 can certainly delete the user information (user utilization information and user authentication information) according to a user's operation.

Further, the terminal 4 stores the user-specific information as needed and compares it with previous user-specific information to thereby detect a change of a user, In the case where detecting a change of a user, the terminal 4 can automatically delete the user information stored therein.

At the same time, the terminal 4 can allow the machine name of the terminal 4 registered in the service providing server 3. This prevents the service improperly used or accessed to thereby prevent an original user from suffering unwanted disadvantage.

Further, the terminal 4 stores the user authentication information which is critical information for the system in the volatile RAM 20. Thus, when, for example, the terminal 4 is stolen, a power supply is interrupted without fail, and it is thus possible to certainly delete the user authentication information.

According to the configuration described above, the terminal 4 can detect a change of a user based on the user-specific information. When detecting a change of a user, the terminal 4 can certainly delete the user authentication information and user information, thereby preventing leakage of the user information.

(5) Other Embodiments

In the above embodiment, the user authentication information is stored in the volatile RAM 20 (FIG. 6). Alternatively, however, the present invention is not limited thereto and the user authentication information may be stored in the nonvolatile flash memory 28 or hard disk drive 21.

In the above embodiment, the machine name, bookmark, service providing information, and FEP learning information are stored as the user utilization information. Alternatively, however, the present invention is not limited thereto and other information specific to a user, such as an E-mail address of another user may be included in the user utilization information.

In the above embodiment, the key input pattern or network use setting is stored as needed and, based on the detection of the change in the key input pattern or network use setting, a change of a user is detected. Alternatively, however, the present invention is not limited thereto and the user change detection means may be realized by other techniques, such as one to detect the characteristics of the user's voices, store them, and compare them for detecting a change of a user.

In the above embodiment, the user utilization information is stored in the hard disk drive 21 (FIG. 6). Alternatively, however, the present invention is not limited thereto and the user utilization information may be stored in a different nonvolatile storage medium such as the flash memory 28, in a volatile storage medium such as the RAM 20, or in a different device such as the hard disk drive 63 of the service providing server 3.

In the above embodiment, the terminal 4 uses an external power supply. Alternatively, however, the present invention is not limited thereto and the terminal 4 may use, as a power supply, a built-in battery. In this case, the user authentication information stored in the RAM 20 can be deleted at the time point when the battery is removed.

In the above embodiment, the controller 60 of the service providing server 3 unconditionally deletes the registered user authentication information or machine name of the terminal 4 in the service withdrawal processing. Alternatively, however, the present invention is not limited thereto and, in the case where the user registers a plurality of terminals 4 in the service, various processing may be performed. For example, the controller 60 of the service providing server 3 may prompt the user to perform the service withdrawal processing after the terminal delete processing of all the other terminals 4 has been completed, or the terminal delete processing of other terminals 4 may automatically be executed with completion of the service withdrawal processing.

In the above embodiment, when a change of a user is detected in the processing for responding key input pattern change and processing for responding network change, only the machine name registered in the service providing server 3 is deleted. Alternatively, however, the present invention is not limited thereto and, when a change of a user is detected in the case where the user owns only one terminal 4, other processing may be added. For example, all the information related to the user, including user authentication information registered in the service providing server 3, may be deleted. In this case, the service providing server 3 can prevent information leakage much more reliably.

In the above embodiment, an SSL is used in all communication interactions between the terminal 4 and service providing server 3. Alternatively, however, the present invention is not limited thereto and a different encryption means or communication scheme may be used in the communication.

In the above embodiment, the CPU 11 of the terminal 4 loads a service utilizing program that has previously been stored in the ROM 13 into the RAM 20 and, according to the service utilizing program, performs the abovementioned service sign-up processing, service login processing, machine name registration processing, bookmark registration processing, service providing information registration processing, FEP learning information registration processing, service withdrawal processing, terminal delete processing, processing for responding key input pattern change, and processing for responding network change. Alternatively, however, the present invention is not limited thereto and a program storage medium storing the service utilizing program may be installed on the terminal 4 in order for the terminal 4 to perform service sign-up processing, service login processing, machine name registration processing, bookmark registration processing, service providing information registration processing, FEP learning information registration processing, service withdrawal processing, terminal delete processing, processing for responding key input pattern change, and processing for responding network change.

Further, while the above various processing can be executed by a hardware configuration shown in FIGS. 2 and 3 in the above embodiment, they can also be executed by a software program. In this case, by installing, through a network or a recording medium, a program that constitutes software on a general-purpose personal computer that can execute processing according to a program when the program is installed thereon, it is possible to execute the above various processing.

Examples of the recording medium that can be used in this case include a magnetic disk (hard disk, floppy disk or the like), a magnetic tape, an optical disk (DVD, DVD-RAM, CD-ROM, CD-R (Recordable)/RW (Rewritable)), a magnetic optical disk (MO (Magneto-Optical disk) or the like), and a semiconductor memory.

In the above embodiment, a radiobroadcast from a radio station is applied as a broadcast that the terminal 4 can receive. Alternatively, however, the terminal 4 may receive an Internet radiobroadcast or satellite radio broadcast and acquire its related information (radiobroadcast information), or the terminal 4 may receive a TV broadcast and acquire various broadcast information related to TV programs on the TV broadcast from a server on a network.

In the above embodiment, various circuits shown in FIG. 3 and program modules shown in FIG. 5 are implemented in the terminal 4. Alternatively, however, the present invention is not limited thereto and the above circuits and modules may be implemented in other various terminal devices including a mobile phone and personal computer. Any terminal can execute the same processing as those executed by the terminal 4 as long as it includes the above circuits and modules.

In the above embodiment, the communication processing section 22 serving as transmission and reception means; RAM 20, hard disk drive 21, and flash memory 28 serving as a storage means; and CPU 11 serving as a user change detection means and a delete means constitute the service utilizing apparatus. Alternatively, however, the present invention is not limited thereto and the transmission means, reception means, storage means, user change detection means, delete means each of which having a different circuit configuration may constitute the service utilizing apparatus.

INDUSTRIAL APPLICABILITY

The present invention can be applied to a service utilizing system that uses terminal apparatuses other than a terminal apparatus for receiving content.

The invention claimed is:
1. A service utilizing apparatus, comprising:
transmission means for transmitting, to a service providing apparatus, user information together with request information that requests a user registration;
reception means for receiving registration completion information indicating a completion of the user registration, the registration completion information being transmitted from the service providing apparatus after the user registration using the user information has been completed;
storage means for storing the user information according to the received registration completion information in a storage medium;
user change detection means for detecting a change of a user who receives a service; and
delete means for deleting the user information stored in the storage medium when the user change detection means detects the change of the user, wherein
the transmission means transmits to the service providing apparatus delete request information that requests a deletion of the user information when the user change detection means detects the change of the user.

2. The service utilizing apparatus according to claim 1, wherein
the transmission means transmits, as the user information, a user ID and a password,
the reception means then receives registration completion information indicating that a registration of the user ID and the password has been completed from the service providing apparatus,
the transmission means then transmits a machine name of the service utilizing apparatus,
the reception means then receives, from the service providing apparatus, registration completion information indicating that the user ID and machine name have been registered in association with each other, and
the storage means stores the machine name in a non-volatile storage medium.

3. The service utilizing apparatus according to claim 1, further comprising:
delete request input means for inputting a delete request, wherein
when the delete request is input through the delete request input means, the transmission means transmits the delete request information to the service providing apparatus.

4. The service utilizing apparatus according to claim 1, wherein when the transmission means transmits the delete request information to the service providing apparatus, the delete means deletes the user information including a machine name of the service utilizing apparatus stored in the storage medium.

5. The service utilizing apparatus according to claim 1, wherein the user change detection means stores an operation pattern of an operation key operated by a user before the change and compares a current operation pattern and the stored operation pattern to detect the change of the user based on an obtained comparison result.

6. The service utilizing apparatus according to claim 1, wherein the user change detection means stores an input pattern of an operation key operated by a user before the change and compares a current input pattern and the stored input pattern to detect the change of the user based on an obtained comparison result.

7. The service utilizing apparatus according to claim 1, wherein the user change detection means stores network use setting information set by the user before the change and detects the change of the user when the stored network use setting information is changed.

8. The service utilizing apparatus according to claim 1, wherein the storage medium is a volatile memory that loses the user information when a power is shut off.

9. A service utilizing method, comprising:
transmitting, to a service providing apparatus, user information together with request information that requests a user registration;
receiving registration completion information indicating a completion of the user registration, the registration completion information being transmitted from the service providing apparatus after the user registration using the user information has been completed;
storing the user information according to the received registration completion information in a storage medium;
deleting the user information stored in the storage medium when a change of a user that receives a service is detected; and
transmitting, with an interface, to the service providing apparatus delete request information that requests a deletion of the user information when the change of the user is detected.

10. The service utilizing method according to claim 9, further comprising:
transmitting, as the user information, a user ID and a password;
receiving registration completion information indicating that a registration of the user ID and the password has been completed from the service providing apparatus;
transmitting a machine name of a service utilizing apparatus;
receiving, from the service providing apparatus, registration completion information indicating that the user ID and the machine name have been registered in association with each other; and
storing the machine name in a non-volatile storage medium.

11. The service utilizing method according to claim 9, further comprising:
transmitting the delete request information to the service providing apparatus when a delete request is input.

12. The service utilizing method according to claim 9, further comprising:
deleting the user information including a machine name of a service utilizing apparatus stored in the storage medium when the delete request information is transmitted to the service providing apparatus.

13. The service utilizing method according to claim 9, further comprising:
storing an operation pattern of an operation key operated by the user before the change; and
comparing a current operation pattern and the stored operation pattern to detect the change of the user based on an obtained comparison result.

14. The service utilizing method according to claim 9, further comprising:
storing an input pattern of an operation key operated by the user before the change; and
comparing a current input pattern and the stored input pattern to detect the change of the user based on an obtained comparison result.

15. The service utilizing method according to claim 9, further comprising:
storing network use setting information set by the user before the change; and
detecting the change of the user when the stored network use setting information is changed.

16. The service utilizing method according to claim 9, wherein the storage medium is a volatile memory that loses the user information when a power is shut off.

17. A computer-readable medium including a service utilizing program, wherein the program, when executed by an information processor, causes the information processor to implement a method comprising:
transmitting, to a service providing apparatus, user information together with request information that requests a user registration;
receiving registration completion information indicating a completion of the user registration, the registration completion information being transmitted from the service providing apparatus after the user registration using the user information has been completed;
storing the user information according to the received registration completion information in a storage medium;

deleting the user information stored in the storage medium when a change of a user that receives a service is detected; and transmitting to the service providing apparatus delete request information that requests a deletion of the user information when the change of the user is detected.

18. A service utilizing apparatus, comprising:

an interface configured to transmit, to a service providing apparatus, user information together with request information that requests a user registration, and configured to receive registration completion information indicating a completion of the user registration from the service providing apparatus;

a memory configured to store the user information according to the received registration completion information; and a processor configured to detect a change in the service utilizing apparatus and configured to delete the user information stored in the memory when the processor detects the change in the service utilizing apparatus, wherein the interface transmits to the service providing apparatus delete request information that requests a deletion of the user information when the processor detects the change in the service utilizing apparatus.

* * * * *